United States Patent [19]

Giovanetti et al.

[11] Patent Number: 5,305,161
[45] Date of Patent: Apr. 19, 1994

[54] ADAPTIVE TRACK SEEKING FOR DISK DRIVES

[75] Inventors: Matthew F. Giovanetti, Northborough; Kenneth F. Veseskis, Hudson; Fernando A. Zayas, Stow; Bernardo Rub, Shrewsbury, all of Mass.

[73] Assignee: Digital Equipment Corporation, Maynard, Mass.

[21] Appl. No.: 980,308

[22] Filed: Nov. 23, 1992

Related U.S. Application Data

[63] Continuation of Ser. No. 546,355, Jun. 29, 1990, abandoned.

[51] Int. Cl.⁵ .............................................. G11B 5/596
[52] U.S. Cl. .................................................. 360/78.06
[58] Field of Search .................... 360/78.06, 78.07, 75, 360/78.01, 78.04; 318/561

[56] References Cited

U.S. PATENT DOCUMENTS

| | | | |
|---|---|---|---|
| 4,149,201 | 4/1979 | Card | 360/75 |
| 4,591,933 | 5/1986 | Quackenbush | 360/78.07 |
| 4,622,604 | 11/1986 | Hashimoto | 360/78 |
| 4,982,298 | 1/1991 | Volz et al. | 360/78.06 |

OTHER PUBLICATIONS

Patent Abstracts of Japan, vol. 11, No. 144 (p-574) May 12, 1987, & JP-A-61 280081 (Yokogawa Electric Corp.) Dec. 10, 1986.
Patent Abstracts of Japan, vol. 7, No. 6 (-167) Jan. 11, 1983 & JP-A-57 164476 (Mitsubishi Denki KK) Oct. 9, 1982.
Patent Abstracts of Japan, vol. 13, No. 276 (p-890) Jun. 26, 1989, & JP-A-01 064178 (Fujitsu Ltd) Mar. 10, 1989.
Patent Abstracts of Japan, vol. 14, No. 353 (p-1086) Jul. 31, 1990 & JP-A-02128380 (NEC Eng. Ltd) May 16, 1990.
Patent Abstracts of Japan, vol. 14, No. 8 (p-987) Jan. 10, 1990 & JP-A-01 258279 (OKI Electric Ind. Co. Ltd) Oct. 16, 1989.
Patent Abstracts of Japan, vol. 13, No. 537 (p-968) Nov. 30, 1989 & JP-A-01 220271 (Fuji Xerox Co. Ltd) Sep. 1, 1989.

*Primary Examiner*—Donald Hajec
*Assistant Examiner*—Won Tae C. Kim
*Attorney, Agent, or Firm*—Albert P. Cefalo; Ronald C. Hudgens; James F. Thompson

[57] ABSTRACT

A method and apparatus for optimizing the track seeking operation of disc drives by adaptively changing the seek velocity profile in response to the actual performance of the drive during track seeking operations based upon the amount of head overshoot and the actuator power dissipation.

1 Claim, 3 Drawing Sheets

ADAPTIVE TRACK SEEKING FOR DISK DRIVES

This application is a continuation of application Ser. No. 07/546,355, filed Jun. 29, 1990 now abandoned.

FIELD OF THE INVENTION

The present invention relates to track seeking operations for disc drives, and more particularly to methods and apparatus for controlling the track seeking servo system for a disc drive to provide optimal acquisition times for track seeking operations.

BACKGROUND OF THE INVENTION

When a head in a disc drive is moved by its corresponding servo-controlled actuator from one track to another selected track, the servo system that controls the actuator must closely monitor and control the velocity of the head on a real time basis. For this purpose, the position information is derived from the read signal from the head.

The analog read signal from the head is converted to a digital read signal by an analog to digital (A/D) converter. The servo system then derives position information from the digital read signal.

For a sampled data control system disc drive, embedded servo position information in the read signal is periodically sampled and passed to a microprocessor. The microprocessor calculates the measured velocity $V_m$ by taking the difference between the position indicated by the current sample and the position indicated by the previous sample and dividing the difference by the sample period.

The microprocessor generates an acceleration command that is used to correct any difference between the measured velocity of the head $V_m$ and a desired velocity of the head $V_d$ according to a seek velocity profile that is appropriate given the number of tracks left to travel to the destination track. The microprocessor command is converted to a constant current analog control signal by a digital to analog converter. This control signal drives the actuator and thereby corrects the velocity of the head.

The seek velocity profile that is used by the microprocessor to determine what level of current to command to the actuator is implemented with the process of comparing the present track position of the head with the selected track position and selecting the desired velocity $V_d$ based upon this difference in tracks. Typically the microprocessor has a table of desired velocities based upon the difference in tracks for this purpose.

The table of desired velocities $V_d$ that are stored in the microprocessor are generally based upon empirical evaluation of a sample of disc drives operating under worst case conditions with substandard actuator motors. As a result, drives with greater seek performance potential operating under normal conditions are not able to seek any faster than weak drives operating under unfavorable conditions.

SUMMARY OF THE INVENTION

The present invention optimizes the track seeking operation of disc drives by adaptively changing the seek velocity profile in response to the actual performance of the drive during track seeking operations based upon the amount of head overshoot, the actuator power dissipation and the actual seek time. The number of head overshoots and the actuator motor power level are monitored during periodic consecutive intervals, and the seek velocity profile is optimized only when the combination of power level and number of overshoots do not meet specified conditions.

DETAILED DESCRIPTION OF THE PREFERRED EMBODIMENT

Figure 1:
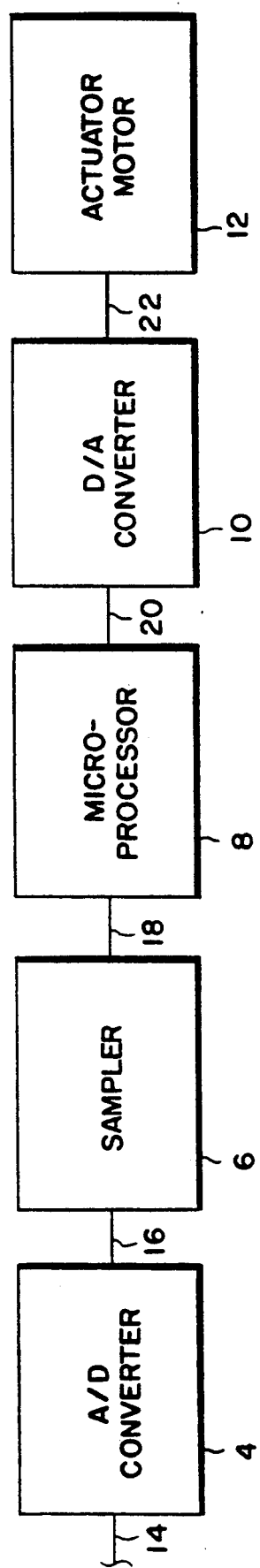
FIG. 1 is a block diagram of a track seeking servo system suitable for incorporating the present invention.

Referring to the drawings, wherein the reference characters designate like or corresponding parts throughout the views, FIG. 1 is a block diagram of a typical track seeking servo system 2. The track seeking system 2 comprises an analog to digital (A/D) converter 4, a sampler 6, a microprocessor 8, a digital to analog converter 10 and an actuator motor 12.

The input of the A/D converter 4 receives an analog read signal on a line 14. The analog read signal is produced by a controlled head (not shown) that is coupled to a servo controlled actuator (not shown).

The A/D converter 4 converts the analog read signal to a digital read signal on a line 16. The digital position information in the digital read signal is sampled by the sampler 6 on a periodic basis.

The sampler 6 provides position samples on a line 18 that are received by the microprocessor 8. The microprocessor 8 determines the measured velocity of the head $V_m$ by comparing the positions of consecutive samples and dividing the difference in positions by the sample period. The respective positions are conveniently determined by identifying the track number information in the samples.

The microprocessor 8 then determines the proper constant current acceleration command that is appropriate for the head to be displaced from its current position to the selected track. The acceleration command is transmitted from the microprocessor 8 to the D/A converter on a line 20. The D/A converter converts the acceleration command signal from the microprocessor 8 to a respective constant current signal that drives the actuator motor 12 via a line 22.

The microprocessor bases its determination of the appropriate constant current acceleration command for a given sample on the current measured head velocity $V_m$, the present position of the head and the desired position of the selected track. The present and desired positions of the head are conveniently compared in terms of the respective track numbers.

The microprocessor 8 determines a desired velocity of the head $V_d$ based upon a seek velocity profile. The seek velocity profile is a lookup table of desired velocities $V_d$ as a function of the number of tracks to the destination track.

During a seek, the constant current acceleration command issued by the microprocessor 8 for each sample period is proportional to the difference between the desired velocity $V_d$, as determined by the seek velocity table based upon the number of tracks to go, and the measured velocity $V_m$.

Figure 2:
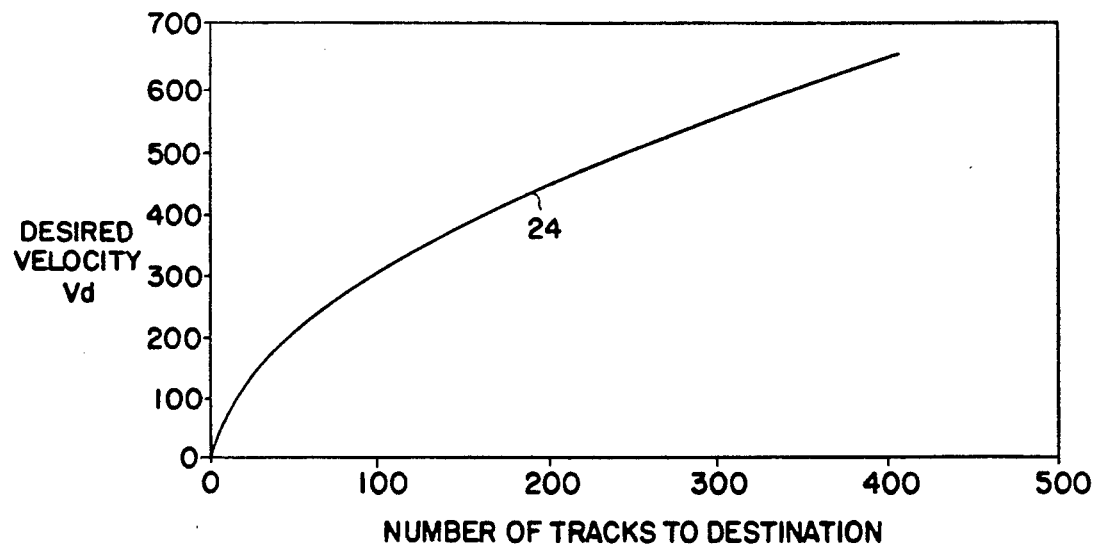
FIG. 2 is a graphical representation of a typical seek velocity profile for a given measured velocity $V_m$ of a disc drive head, indicating desired velocities $V_d$ as a function of the number of tracks for the head to go to the desired track.

FIG. 2 is a graphical representation of a typical seek velocity profile for a given current measured velocity $V_m$. A line 24 represents the amplitude of the desired velocity $V_d$ as a function of the number of tracks to go to the destination track.

As part of developing a seek velocity profile such as shown in FIG. 2, the microprocessor 8 determines the maximum attainable terminal velocity for the head $V_t$. The microprocessor 8 then determines the distance, in the number of tracks, traveled in going from the terminal velocity $V_t$ to the final velocity $V_o$ at the point of the destination track $x_o$. The microprocessor 8 generates a seek velocity profile table by determining the appropriate desired velocities $V_d$ between the terminal velocity $V_t$ and the final velocity $V_o$.

The terminal velocity of the head is established by the microprocessor 8 according to the following procedure. The microprocessor 8 determines the distance of the longest seek for the system 2, in number of tracks. The microprocessor 8 creates a generally step-shaped velocity profile over the distance of the longest seek with the terminal velocity $V_t$ set at to the maximum allowable value as determined by the drive system. The terminal velocity $V_t$ is positioned along the profile for a distance of roughly half of the total distance of the seek. The final values of velocities are set to the final velocity $V_o$.

The terminal velocity profile so established by the microprocessor 8 is then used to determine the terminal velocity for one seek that is roughly equal to this distance. The microprocessor 8 measures the terminal velocity of the seek, while using the terminal velocity profile, at a distance of roughly half the actual total length of the seek. Because of the mass moved by the actuator motor 12, the terminal velocity profile as measured is generally triangular in shape.

The deceleration distance going from the terminal velocity $V_t$ to the final velocity $V_o$ is then established by the microprocessor 8 according to the following procedure. The microprocessor 8 determines a terminal velocity $V_t$ using the velocity profile for $V_t$ as described above with a seek length corresponding to a distance that is somewhat shorter than the distance of the seek itself to guarantee that the terminal velocity $V_t$ is reached. This is considered a "long seek".

The distance to go, in the number of tracks, is then measured by the microprocessor 8 from the terminal velocity $V_t$ to the final velocity $V_o$. This is the deceleration distance for the seek.

The microprocessor 8 then creates an idealized seek velocity profile, based upon the relationship that the actual velocity desired at any point is proportional to the square root of the distance plus a constant. This may be expressed according to the relationship $$V_d = (K_1 * x^{\frac{1}{2}}) + K_2$$

wherein the constants $K_1$ and $K_2$ are determined by the values of $V_t$, $x_t$, $V_o$ and $x_o$.

The microprocessor 8 generates values of desired velocities $V_d$ for each track for the number of tracks to go for the entire distance of the seek. A seek velocity profile is then created by the microprocessor 8 with the value of the desired velocity $V_d$ as a function of the number of tracks to go to the destination track.

The values of the idealized velocity profile so determined are applicable to a full-deceleration seek. For the case of a controlled-deceleration seek, as used in the preferred embodiment, the servo system 2 does not integrate out the constant error between the desired velocity $V_d$ and the measured velocity $V_m$ because of the sampling nature of the servo system 2.

To overcome any track seeking inaccuracy that is attributable to this error, the microprocessor 8 shifts the seek velocity profile by the duration of one sample period. To determine the time-shifted seek velocity profile, the time t for each value of desired velocity $V_d$ in the idealized seek velocity profile is determined using the corresponding distance x according to the relationship $$t = \frac{V^2 - (2 * K_2 * V) + K_2^2 - (K_1^2 * C)}{K_1^2 * V}$$

where $$V = (K_1 * x^{\frac{1}{2}}) + K_2 \text{ and } C = \frac{V_0^2 - (2 * V_0 * K_2) + K_2^2}{K_1^2}$$

The microprocessor 8 shifts the time t by one sample period T so that the shifted time $t' = t + T$. Using the shifted value of time t', the microprocessor 8 determines the time-shifted desired velocity $V_d'$ for the corresponding distance x according to the following relationship:

$$V_d' = \left[ (K_1^2 * C) - K_2^2 + \left[ \frac{(2 * K_2) + (K_1^2 * t')}{2} \right]^2 \right]^{\frac{1}{2}} + \frac{(2 * K_2) + (K_1^2 * t')}{2}$$

Figure 3:
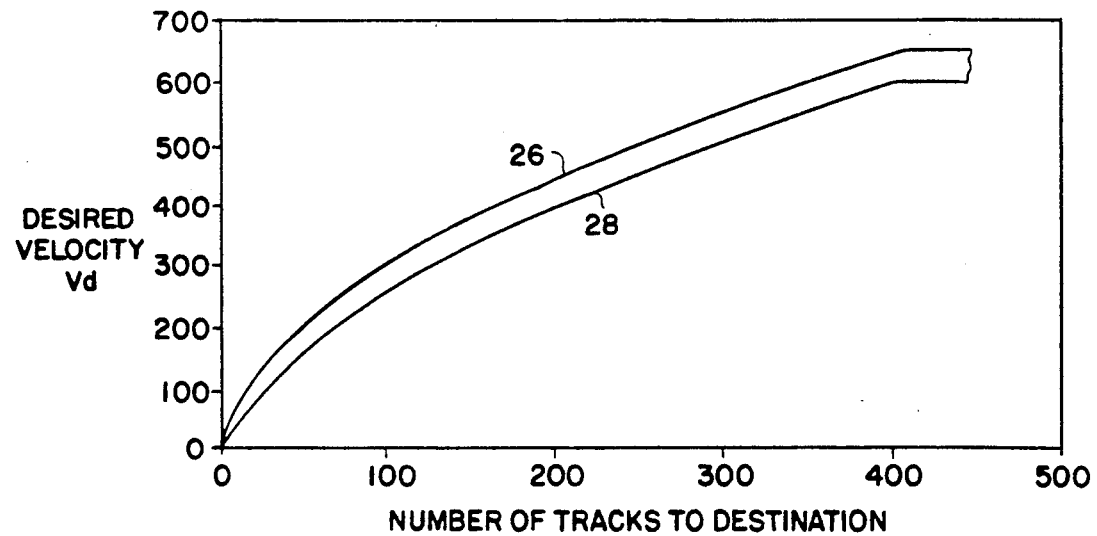
FIG. 3 is a typical seek velocity profile and a corresponding shifted-time seek velocity profile.

FIG. 3 is a graphical representation of an idealized seek velocity profile and a corresponding time-shifted velocity profile. A line 26 represents the amplitude of the desired velocity $V_d$ as a function of the number of tracks to go to the destination track. A line represents the amplitude of the time-shifted desired velocity $V_d'$ as a function of the number of tracks to go to the destination track.

In order to control power dissipation for the actuator motor 12 and to track parameter shifts of the actuator motor 12 during operation, it is necessary for the microprocessor 8 to periodically perform an update of the seek velocity profiles that it generates as described above. In addition, this embodiment allows for the adjustment of the terminal velocity $V_t$ without performing the two special seeks, thereby saving time. In the preferred embodiment, such updates are completed within approximately 150 milliseconds so that their impact upon normal drive performance is almost unnoticeable.

However, the number of periodic updates are minimized to insure that they do not interfere with the normal operation of the drive. The microprocessor 8 determines when such periodic updates are necessary by keeping track of its constant current command signal to monitor power dissipation of the actuator motor 12 and the number of seek overshoots to determine how well the seek velocity profile is optimized.

Figure 4:
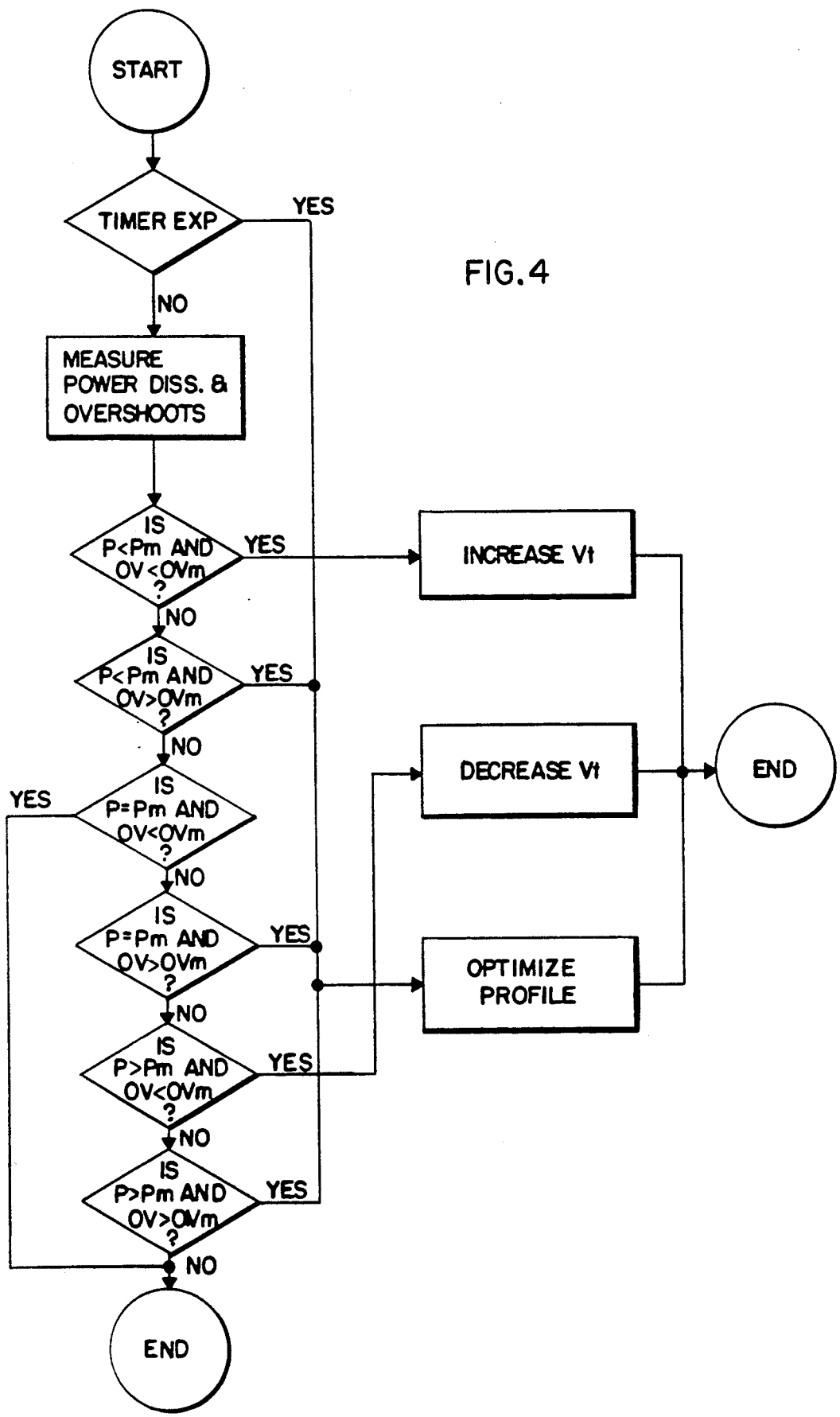
FIG. 4 is a flow chart of the methodology of the present invention.

FIG. 4 is a flow chart of the procedure used by the microprocessor 8 in determining when a periodic seek velocity profile is necessary. On a periodic basis, according to a periodic interval that depends upon the individual characteristics of the drive, the microprocessor 8 makes a determination of an update.

The microprocessor 8 monitors a timer that is set to expire a predetermined period after each update. If the timer has expired, the microprocessor 8 recalculates the velocity seek profile. If the timer has not expired, the microprocessor 8 measures the power dissipation of the actuator motor 12 and the number of overshoots of the head for the interval.

The microprocessor 8 then compares the power P dissipated in the interval with the maximum power $P_m$ allowed per interval and the number of overshoots OV in the interval with the maximum number of overshoots $OV_m$ allowed per interval.

If P is less than $P_m$ and OV is less than $OV_m$, the microprocessor 8 increases the value of the terminal velocity $V_t$ accordingly. If not, then the microprocessor 8 determines if P is less than $P_m$ and OV is greater than $OV_m$. If these two conditions are true, the microprocessor 8 optimizes the seek velocity profile.

If these two conditions are not true, then the microprocessor 8 determines if P equals $P_m$ and OV is less than $OV_m$. If so, the microprocessor 8 does not perform an update during this interval. If not, the microprocessor 8 determines if P equals $P_m$ and OV is greater than $OV_m$. If so, then the microprocessor 8 optimizes the seek velocity profile.

If not, the microprocessor 8 determines if P is greater than Pm and OV is less than $OV_m$. If so, the microprocessor 8 decreases the value of the terminal velocity $V_t$ accordingly. If not, the microprocessor 8 determines if P is greater than $P_m$ and OV is greater than $OV_m$. If true, the microprocessor 8 optimizes the seek velocity profile. If not, the microprocessor 8 does not perform an update during this interval.

As described above, the present invention monitors the power for the actuator motor 12 and the number of overshoots of the head during seeks during consecutive periodic intervals and updates the seek velocity profiles for the disc drive to adaptively optimize the seek times for the disc drive under actual operation conditions.

Thus there has been described above a method and apparatus for adaptively optimizing the seek times of a disc drive under actual operating conditions by altering the seek velocity profile according to the frequency of head overshoots during seek operations and the power level of the actuator motor. It will be understood that various changes in the details and configurations of the preferred embodiment described above in order to explain the nature of the invention may be made by those skilled in the art within the principle and scope of the present invention as expressed in the appended claims.

What is claimed is:

1. A method of operating a disk drive having a read/write head controlled by an actuator, comprising the steps of:

determining a terminal velocity Vt of said actuator to be used in generating a seek velocity profile associated with said read/write head;

generating said seek velocity profile based on the determined Vt;

continually monitoring the power dissipation P of said actuator during normal operation of said disk drive by tracking the level of an actuator current signal associated with said actuator;

tracking the number of track-seeking overshoots OV of said read/write head during each of consecutive periodic update intervals of normal disk drive operation by tracking the level of a head position signal associated with said read/write head;

increasing Vt when P is less than a predetermined maximum actuator power dissipation Pm and OV is less than a predetermined maximum number of track-seeking overshoots OVm;

decreasing Vt when P is greater than Pm and OV is less than OVm; and updating said seek velocity profile based on Vt at least once during each of said update intervals and also whenever OV is greater than OVm during normal operation.

* * * * *